United States Patent [19]
Kumar et al.

[11] Patent Number: 6,022,827
[45] Date of Patent: Feb. 8, 2000

[54] SOD OR OTHER VEGETATION HAVING A ROOT SUPPORT MATRIX WITH BENEFICIAL PLANT ADJUVANTS THEREON

[75] Inventors: Vijayendra Kumar, New Castle, Del.; Darryl Alan Meade, Lincoln University, Pa.

[73] Assignee: E. I. du Pont de Nemours and Company, Wilmington, Del.

[21] Appl. No.: 08/788,484

[22] Filed: Jan. 28, 1997

[51] Int. Cl.⁷ .................................................. A01N 25/34
[52] U.S. Cl. ................................................. 504/116; 47/9
[58] Field of Search .................. 504/116; 47/9

[56] References Cited

U.S. PATENT DOCUMENTS

| | | | |
|---|---|---|---|
| 3,334,556 | 8/1967 | Owen | 94/7 |
| 3,848,359 | 11/1974 | Seith et al. | 47/56 |
| 3,863,388 | 2/1975 | Loads | 47/56 |
| 4,023,506 | 5/1977 | Robey | 111/1 |
| 4,066,490 | 1/1978 | Yoshimi | 156/276 |
| 4,357,780 | 11/1982 | Ball | 47/56 |
| 4,720,935 | 1/1988 | Rogers et al. | 47/56 |
| 4,786,550 | 11/1988 | McFarland et al. | 428/203 |
| 4,790,691 | 12/1988 | Freed | 405/263 |
| 4,819,933 | 4/1989 | Armond | 272/3 |
| 4,867,614 | 9/1989 | Freed | 405/263 |
| 4,900,010 | 2/1990 | Wengmann et al. | 272/3 |
| 4,916,855 | 4/1990 | Halliday et al. | 47/58 |
| 5,014,462 | 5/1991 | Malmgren et al. | 47/1.01 |
| 5,120,344 | 6/1992 | Libor et al. | 71/27 |
| 5,177,898 | 1/1993 | Decker | 47/56 |
| 5,189,833 | 3/1993 | Clark | 47/56 |
| 5,209,768 | 5/1993 | Hughes | 504/313 |
| 5,224,290 | 7/1993 | Molnar et al. | 47/56 |
| 5,224,292 | 7/1993 | Anton | 47/64 |
| 5,326,192 | 7/1994 | Freed | 405/258 |
| 5,346,514 | 9/1994 | Molnar et al. | 47/58 |
| 5,397,368 | 3/1995 | Molnar et al. | 47/58 |
| 5,404,671 | 4/1995 | Farrow, Jr. et al. | 47/1.01 |
| 5,507,845 | 4/1996 | Molnar et al. | 47/1.01 |
| 5,555,674 | 9/1996 | Molnar et al. | 47/56 |

FOREIGN PATENT DOCUMENTS

| | | | |
|---|---|---|---|
| 0 204 381 | 12/1986 | European Pat. Off. | E01C 13/00 |
| 2 613 391 | 10/1988 | France | E01C 13/00 |
| 2-128622 | 5/1990 | Japan | A01G 1/00 |
| 1202525 | 1/1986 | U.S.S.R. | A01G 7/06 |
| WO 94/09613 | 5/1994 | WIPO | A01G 1/12 |
| WO 95/19101 | 7/1995 | WIPO | A01G 1/12 |

*Primary Examiner*—S. Mark Clardy

[57] ABSTRACT

A sod comprising a root support matrix that itself comprises a mixture of soil and/or sand and shredded carpet pieces has a beneficial plant adjuvant disposed on the shredded fabric pieces, preferably in the form of shredded carpet pieces. The beneficial plant adjuvant is initially suspended in an aqueous solution of water and a degradable, slow-release, water-soluble liquid polymer that when dried forms a coating on the surface of the shredded carpet pieces.

9 Claims, 1 Drawing Sheet

6,022,827

SOD OR OTHER VEGETATION HAVING A ROOT SUPPORT MATRIX WITH BENEFICIAL PLANT ADJUVANTS THEREON

FIELD OF THE INVENTION

This invention relates generally to the production of sod or other vegetation and, more particularly, to a sod or other vegetation produced in a root support matrix using shredded fabric pieces having a beneficial plant adjuvant thereon, the shredded fabric pieces being preferably, recycled waste carpet in the form of shredded carpet pieces.

BACKGROUND OF THE INVENTION

U.S. Pat. No. 5,404,671 (Farrow, Kumar and Mitchell), assigned to the assignee of the present invention, discloses a method for producing sod and the sod resulting therefrom, which utilizes a root support matrix comprised of shredded, recycled carpet pieces and compost. This patent recognizes the desirability of a source of slow release plant nutrients in the sod.

U.S. Pat. No. 5,224,292 (Anton), assigned to the assignee of the present invention, also recognizes the desirability of slow release plant nutrients. This patent discloses a fibrous mat for growing plants which includes a layer of hollow synthetic fibers having in their lumens water-soluble plant adjuvants.

SUMMARY OF THE INVENTION

The present invention is directed to a sod in a root support matrix comprising a mixture of soil and/or sand and/or compost and shredded fabric pieces, with a plurality of plants growing in said root support matrix, said plants having roots entangled with said shredded fabric pieces. Preferably, the shredded fabric pieces take the form of shredded carpet pieces.

The shredded fabric pieces have a beneficial plant adjuvant disposed thereon. The beneficial plant adjuvant is initially suspended in an aqueous solution of water and a degradable, slow-release, water-soluble liquid polymer that, when dried, forms a coating on the surface of the shredded carpet pieces. The concentration of the water soluble liquid polymer in the aqueous solution is from about three (3) to about eighteen (18) percent, and more preferably, from about five (5) to about fifteen (15) percent.

The water soluble liquid polymer is preferably selected from the group consisting of poly(vinyl alcohol), poly (ethylene oxide), and methyl hydroxy propyl cellulose, and mixtures thereof.

The beneficial plant adjuvant is selected from the group consisting of plant nutrients, growth regulators, fertilizers, fungicides, algaecide, pesiticides, weed killers, and combinations thereof.

The weight of the aqueous solution is from about two (2) to about five (5) times the weight of the shredded carpet pieces, and more preferably, about four (4) times the weight of the shredded carpet pieces.

BRIEF DESCRIPTION OF THE DRAWING

The invention will be more fully understood from the following detailed description, taken in connection with the accompanying drawing, in which.

DETAILED DESCRIPTION OF THE INVENTION

Figure 1:
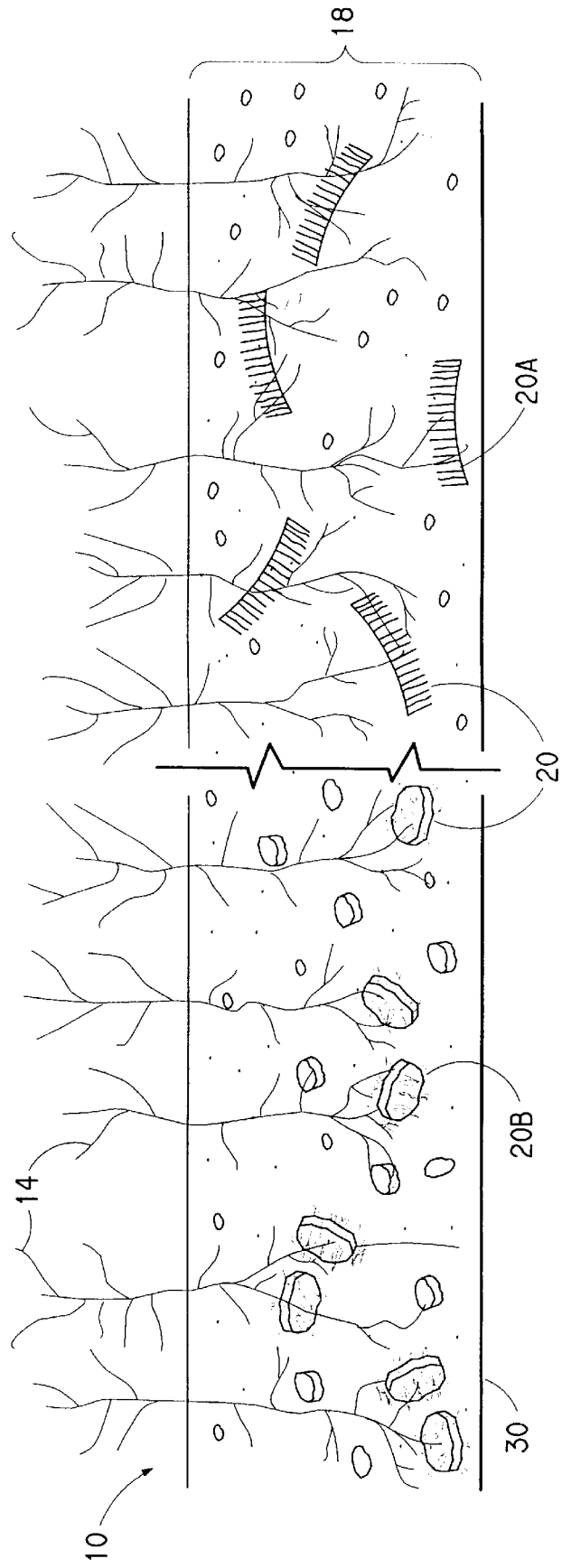
FIG. 1 is a side-elevational view taken in cross-section of a module of sod embodying the present invention, in which the portion of the sod on the right side of the FIGURE includes shredded carpet pieces in the form of discrete carpet pieces, while the portion of the sod on the left side of the FIGURE includes shredded carpet pieces in the form of shredded carpet fragments.

Throughout the following detailed description, similar reference numerals refer to similar elements in all Figures of the drawings.

Illustrated in FIG. 1 in a side elevational view is a volume of sod generally indicated by the reference character 10 in accordance with the present invention. The sod 10 is shown in situ, in its growing location, prior to harvesting. Sod in accordance with the present invention is believed to be especially resistant to drought conditions.

The sod 10 comprises a plurality of viable plants, generally indicated by the reference character 14, growing in a root support matrix generally indicated by the reference character 18. The root support matrix 18 includes shredded carpet pieces, generally indicated by the reference character 20. As will be developed herein the shredded carpet pieces 20 may take the form of discrete carpet pieces or the form of shredded carpet fragments. A root support matrix 18 having discrete carpet pieces 20A is illustrated in the right hand side of FIG. 1, while the left hand side of FIG. 1 illustrates a root support matrix 18 having shredded carpet fragments 20B therein. Of course, any given volume of sod 10 may include both forms of shredded carpet pieces, if desired.

The sod 10 is illustrated as being supported upon a substrate 20. The substrate 20 may be root impervious (such as a slab of concrete or a sheet of plastic film) or a degradable fabric (such as jute). The substrate 20 assists in transporting the sod to its location of intended use. Of course, sod 10 in accordance with the present invention may be grown in a prepared bed formed in the earth. A subsurface foundation, such as of choker-type natural separation filter over a porous aggregates base, may be laid beneath the bed, if desired.

ROOT SUPPORT MATRIX

Generally speaking, the root support matrix 18 comprises a growing medium (i.e., a mixture of soil and/or sand, and, optionally, compost) mixed with shredded carpet pieces (as defined herein). The shredded carpet pieces may comprise from about one-tenth percent (0.1%) to about five percent (5.0%) by weight of the matrix, and more preferably, from about three-tenths percent (0.3%) to about three percent (3.0%) by weight of the root support matrix.

As illustrated, in a mature sod 10 the root portion of the plants 14 is entangled with the shredded carpet pieces 20A or 20B, as the case may be.

Growing Medium

As a general proposition the materials that comprise the growing medium (i.e., soil and/or sand and, optionally compost) and their relative proportions depend on the locality in which the sod 10 is being used and the particular combination of properties that the sod 10 is desired to exhibit.

Soil

The soil used in the growing medium for a sod to be used in any given locality may be formed from any clay, loam or silt that is native or exotic to a given locality. The term "soil" is used in a generic way to mean any material in which the sod is grown.

Sand

If used within the growing medium for a given locality the sand should be selected on the basis of its coarseness, which facilitates field drainage. Preferably, about ninety (90%) of the sand particles should have a diameter between 0.25 and 0.75 millimeters.

The relative proportion of the sand to soil will depend upon the particular circumstances of any given installation. It should be understood that the growing medium may be all soil, all sand, or some combination therebetween (and other materials as described below).

Other Materials

The present invention also contemplates the addition of a soil conditioner and/or compost to the growing medium portion of the root support matrix. The soil conditioner, such as diatomaceous earth, should comprise no more than about thirty percent (30%) of the total weight of the growing medium.

By "compost" it is meant any naturally occurring or manufactured organic matter (including peat or mulch) that is added as a separate constituent to the growing medium. Compost, if used, is used in a minor amount, that is, an amount less than about fifteen percent (15%) of the weight of the growing medium. When computing the relative percentage of "compost" within the growing medium, other organic matter (such as worms, insects, weeds etc.) that naturally occur in the constituent materials in the growing medium are not included.

Shredded Fabric Pieces

The shredded fabric pieces that form a part of the root support matrix 18 may be produced from any form of textile fabric (for example, clothing, bedding). However, recycled waste carpet in the form of shredded carpet pieces are preferred. Accordingly, hereinafter, the invention will be discussed in terms of shredded carpet pieces.

The shredded carpet pieces are produced by reclamation of used residential and commercial carpets. In fact, the diversion of materials hitherto seen as waste material (i.e., used carpet) to a productive end is believed to be one of the primary advantages of the present invention. The use of newly manufactured carpet to form the shredded carpet pieces used in the present invention should not be excluded. Any type of carpet including, but not limited to, shag, cut pile and loop pile may be converted into carpet pieces useful in the present invention.

As is well known, traditional residential and commercial carpet comprises an array of face yarns that are tufted through a primary backing. The face yarns are typically formed of synthetic materials (such as nylon, polypropylene, and polyester) or natural materials (such as wool). Primary backing is usually formed of polypropylene, polyester, jute or nylon. A secondary backing, also typically formed of the same materials, is adhered (usually by a latex adhesive) over the tufts exposed on the undersurface of the primary backing. The term "carpet backing material" as used herein includes either primary backing, secondary backing, or latex adhesive, and combinations of two or more of the same.

"Shredded carpet pieces" as used in this application are formed by shredding, cutting, grinding or otherwise pulverizing carpet. Similar to the usage in the above-referenced Farrow et al. patent, the term "shredded carpet pieces" as used in this application denotes sections of carpet backing material (mainly primary backing) having dimensions from about one-half (0.5) inch to about one (1) inch in width and from one (1) inch to about five (5) inches in length and include attached face yarns.

In addition, the term "shredded carpet pieces" as used in this application is to be construed to include pieces of carpet that have been pulverized to such an extent that "shredded carpet fragments" are formed. "Shredded carpet fragments" comprise only a mass of entangled face yarns, individual ones of which may or may not have bits of carpet backing material attached. Shredded carpet fragments are pulverized to an extent such that at least about ninety percent (90%), and more preferably at least about ninety-five percent (95%), of the bits of carpet backing material that remain attached to an individual face yarn have no one dimension greater than about one-quarter (0.25) inch.

BENEFICIAL PLANT ADJUVANTS

In accordance with the present invention beneficial plant adjuvants are disposed on the shredded carpet pieces. The beneficial plant adjuvants are selected from the group consisting of plant nutrients, growth regulators, fertilizers, fungicides, algaecide, pesiticides, weed killers, and combinations thereof. Fertilizers include nitrogen, phosphorous and potassium. Growth regulators include copper hydroxide. Nutrients include boron, calcium and sulfur.

The beneficial plant adjuvants are initially suspended in a solution of water and a degradable, slow-release, water-soluble liquid polymer that, when dried, forms a coating on the surface of the shredded carpet pieces. The dried coating encapsulates the beneficial plant adjuvants therein. As the coating degrades (whether by the action of water, microbes, sunlight, or any other agency) the beneficial plant adjuvants are released into the soil for uptake by the plants.

Although any water soluble liquid polymer may be used so long as it is able to perform the above-described encapsulation of the beneficial plant adjuvants, preferred is a water soluble liquid polymer selected from the group consisting of poly(vinyl alcohol) (PVOH), poly(ethylene oxide) (PEO), and methyl hydroxy propyl cellulose (MHPC), and mixtures thereof. The water soluble liquid polymer in the beneficial plant adjuvant solution should be in the range from about three (3) percent to about eighteen (18) percent, and more preferably, in the range from about five (5) percent to about fifteen (15) percent.

An aqueous solution of water soluble liquid polymer is prepared by dissolving the polymer in water, with the water preferably being heated to speed the dissolution. Preferably, a pre-made water-soluble film of poly(vinyl alcohol), poly (ethylene oxide) or methyl hydroxy propyl cellulose is dissolved in water to generate the solution. More than one film may be used if the mixture of the polymer is preferred.

Once the water soluble liquid polymer solution is prepared the beneficial plant adjuvants are added at amounts found efficacious for specific species of grass or other plants.

MIXING AND FORMULATING

The aqueous liquid polymer solution is added to and mixed with the shredded carpet pieces in a suitable vessel. The pieces are allowed to absorb the solution. The weight of the water soluble liquid polymer solution (without including the weight of the beneficial plant adjuvants) should be in the range from about two (2) to about five (5) times the weight of the shredded carpet pieces, and more preferably, about four (4) times the weight of the shredded carpet pieces.

To form the root support matrix the shredded carpet pieces (prepared as described) are mixed with the desired mixture of soil and/or sand and/or compost forming the growing medium. The growing medium is poured into a rotary mixer, such as a cement mixer. The shredded carpet pieces are next added to the rotating mixer to insure uniform mixing of the shredded carpet pieces with the growing medium.

If necessary water may have to be added to the rotary mixer to enhance the mixability of the shredded carpet pieces with the growing medium. As the wetted shredded carpet pieces dry the liquid polymer solution encapsulates the beneficial plant adjuvants on the surface of the shredded carpet pieces.

PLANTS

Although the primary vegetation grown using the present invention is turfgrass sod, it should be understood that this invention is not to be construed as limited thereto. Other plants, such as flowers or vegetables, may be substituted for turfgrass. The vegetation is usually started using viable seeds, seedlings, sprigs, washed sod, root divisions, or plant plugs. (Washed sod is a grass cover held together by a root matrix alone, produced by growing grass in sand and washing away the sand.)

METHOD

Turfgrass sod or other vegetation may be grown in accordance with the present invention. The root support matrix 14, as described above, is prepared. The root support matrix 14 is extruded through an apparatus capable of continuously producing a uniform thickness of extrudate [e.g., from about two (2) to about four (4) inches]. The matrix 14 may be placed on the substrate 20 or directly into a bed, as desired. Into the root support matrix 14 is placed any desired species of vegetation in the form of viable seeds, seedlings, seedlings, sprigs, washed sod, root divisions, or plant plugs. Seeds or sprigs may be sprinkled uniformly on the extrudate layer. Alternatively, washed sod may be rolled on top of the extrudate layer.

The vegetation is appropriately watered, fertilized, etc., to establish root growth. The plants' roots penetrate into and entangle with the shredded carpet pieces as the plants grow. Vegetation should be mowed regularly to an acceptable height for the species and climate.

After a period of time (depending on plant species and growing conditions) the vegetation is ready for harvest, using an apparatus such as a rotary saw. In the case of turfgrass sod harvesting is accomplished by cutting the matrix having the mature turfgrass sod into squares or rectangular blocks, known as "modules". The sod could also be cut and formed into rolls.

When harvested the sod is relocated to the location of intended use. Of course, if the sod is grown at its location of intended use, the harvesting step is omitted.

EXAMPLE

The following procedure was used for making sod in accordance with the present invention and evaluating the same.

An aqueous solution of water and a degradable, slow-release, water-soluble liquid polymer was prepared by adding twenty-five (25) grams of PVOH film to five-hundred milliliters (500 ml) of water. Added to this solution was one-hundred milliliters (100 ml) of a two percent (2%) 20-20-20 fertilizer. The fertilizer-loaded aqueous solution was then mixed with one-hundred-twenty-five grams (125 g) of shredded carpet pieces in a resealable plastic bag so that the shredded carpet pieces were thoroughly wetted by the solution.

A common soil mixture was then added and the soil mixture and shredded carpet pieces were blended in the plastic bag until the blend appeared uniform. The soil mixture was so-called "Metro Mix 360" which included horticultural vermiculite, Canadian sphagum peat moss, bark ash, composted pine bark, as well as quartz, limestone and gypsum.

The blend was then placed into (20.5)×(10.5)×(2) inch test plot trays, according to the test design below. In each test plot tray the seeds used consisted of ten grams (10 g) of ryegrass seed and two-tenths grams (0.2 g) of seeds of two common broadleaf weeds, common pigweed and lambs quarters. Each test plot tray received cycles of twelve (12) hours of light followed by twelve (12) hours of darkness. Each test plot tray was watered as needed. No additional fertilizer was applied beyond the initial mixture.

As controls, test plot trays were prepared of (a) soil and seed with no shredded carpet pieces; (b) soil and seed with uncoated shredded carpet pieces (i.e., no fertilizer-loaded aqueous solution was used); and (c) soil and seed with uncoated shredded carpet pieces having fertilizer spray applied to the upper surface of the plots. All test plot trays were subjected to identical conditions.

The eight test plot trays were as follows:

| Tray | Composition |
| --- | --- |
| 1 | Soil and seed |
| 2 | Soil, seed and uncoated shredded carpet pieces |
| 3, 6 | Soil, seed and uncoated shredded carpet pieces with one hundred milliliters (100 ml) of liquid 20-20-20 fertilizer sprayed on the soil on the top surface of the plot |
| 4, 7 | Soil, seed and shredded carpet pieces coated with the aqueous solution of PVOH and 20-20-20 fertilizer |
| 5, 8 | Soil, seed and shredded carpet pieces coated with the aqueous solution of PVOH and 20-20-20 fertilizer and 0.02 grams herbicide |

Results:

| Tray | Visual Observation |
| --- | --- |
| 1 | Very rapid seed germination; good plant growth |
| 2 | Rapid germination; good plant growth |
| 3, 6 | Rapid germination; good plant growth |
| 4, 7 | Slow initial germination; good growth after a week |
| 5, 8 | No germination |

The test plot trays (trays 4 and 7) which included shredded carpet pieces coated with PVOH/fertilizer solution exhibited slower plant germination than the other plots but good plant growth thereafter. The lack of germination in test plot trays 5 and 8 was attributed to excessively high herbicide loading.

Drought Resistance

Once mature plant growth was established in each of the test plot trays (except trays 5 and 8), watering of the grass was discontinued for two weeks to determine the effects of including shredded carpet pieces coated with PVOH/fertilizer solution on the ability of the plants to withstand periods of drought. The plots were evaluated weekly.

Week 1

In all test plot trays, the grass plants appeared wilted although there was still some green growth under the taller shoots. The weeds appeared to be dying.

Week 2

All test plot trays contained dry dead grass, however, there was still at least some green undergrowth present in each plot. The plots with the most green growth were those which included shredded carpet pieces coated with PVOH/fertilizer solution. The plot which included uncoated shredded carpet pieces and that with soil alone were roughly equivalent and each had some green growth. The plants in the plots which had the fertilizer sprayed on the soil surface were approximately ninety percent (90%) dry and dead.

Watering was resumed on an as-needed basis. The plants were trimmed to 3 inches high.

Week 4

Dead grass was still present in each test plot tray, however the plots which included shredded carpet pieces coated with PVOH/fertilizer solution (except trays 4 and 7) showed a significant amount of new growth. The plots that contained the mixture of uncoated shredded carpet pieces and soil (trays 2, 3 and 6) had less new growth, notwithstanding the fact that fertilizer spray was applied to two of the plots (trays 3 and 6). The plot that contained soil alone (tray 1) showed no new growth.

Conclusions

As a general conclusion a more sustained greening during drought conditions was observed in the test plots which included shredded carpet pieces coated with a solution of PVOH and fertilizer (trays 4 and 7), as compared with the 12 control plots which included unreinforced soil (tray 1) and soil reinforced with uncoated shredded carpet pieces (trays 2, 3, and 6).

A re-growth of grass was observed after the drought tests in the test plots which included shredded carpet pieces coated with the PVOH/fertilizer solution (trays 4 and 7), in contrast with the soil control (tray 1) which never did recover from the drought.

Those skilled in the art, having the benefit of the teachings of the present invention may effect numerous modifications thereto. These modifications are to be construed as lying within the contemplation of the present invention, as defined by the appended claims.

What is claimed is:

1. Sod comprising:
   (a) a root support matrix comprising a mixture of soil and/or sand and shredded fabric pieces; and
   (b) a beneficial plant adjuvant disposed on the shredded fabric pieces, the beneficial plant adjuvant being initially suspended in an aqueous solution of water and a degradable, slow-release, water-soluble liquid polymer that, when dried, forms a coating on the surface of the shredded fabric pieces, the concentration of the water soluble liquid polymer in the aqueous solution being from about three (3) to about eighteen (18) percent.

2. The sod of claim 1 wherein the shredded fabric pieces comprise shredded carpet pieces.

3. The sod of claim 2 wherein the concentration of water soluble liquid polymer in the beneficial plant adjuvant solution is from about five (5) to about fifteen (15) percent.

4. The sod of claim 2 wherein said beneficial plant adjuvant is selected from the group consisting of plant nutrients, growth regulators, fertilizers, fungicides, algaecide, pesiticides, weed killers, and combinations thereof.

5. The sod of claim 2 wherein the water soluble liquid polymer is selected from the group consisting of poly(vinyl alcohol), poly(ethylene oxide), and methyl hydroxy propyl cellulose and mixtures thereof.

6. The sod of claim 2 wherein the weight of the water soluble liquid polymer solution is from about two (2) to about five (5) times the weight of the shredded carpet pieces.

7. The sod of claim 5 wherein the weight of the water soluble liquid polymer solution is about four (4) times the weight of the shredded carpet pieces.

8. A method for producing vegetation comprising the steps of:
   (a) preparing a liquid mixture in which a beneficial plant adjuvant is suspended in an aqueous solution of water and a degradable, slow-release, water-soluble liquid polymer, the concentration of the water soluble liquid polymer in the aqueous solution being from about three (3) to about eighteen (18) percent;
   b) mixing the liquid mixture of beneficial plant adjuvants with shredded fabric pieces so that, when dried, a coating is formed on the surface of the shredded fabric pieces;
   c) forming a root support matrix comprising a mixture of soil and/or sand and the shredded fabric pieces;
   d) placing viable seeds, seedlings, rooted cuttings, root divisions, or plant plugs into the root support matrix; and
   e) watering said seeds, seedlings, rooted cuttings, root divisions, or plant plugs to establish root penetration into said root support matrix and root entanglement with said fabric pieces to form mature vegetation.

9. The method of claim 8 wherein the shredded fabric pieces comprise shredded carpet pieces.

* * * * *